United States Patent Office 2,926,168
Patented Feb. 23, 1960

2,926,168

2-ALKYL-6,7-DIHYDRO-5-H-THIOPYRANO (3,2d) THIAZOLE, QUATERNARIES AND PROCESS

Robert H. Sprague, East Hampton, Conn., assignor to Sperry Rand Corporation, New York, N.Y., a corporation of Delaware No Drawing. Original application April 27, 1956, Serial No. 580,996. Divided and this application November 5, 1958, Serial No. 774,798

10 Claims. (Cl. 260—302)

This invention relates to a new composition of matter. More particularly it relates to 2-alkyl-6,7-dihydro-5-H-thiopyrano(3,2d)thiazole and to a process for preparing same.

This application is a division of the co-pending application of Robert H. Sprague, Serial Number 580,996, filed April 27, 1956, for Sensitizing Dyes Containing a 6,7-Dihydro-5-H-Thiopyrano(3,2d)Thiazole Nucleus.

It has been found that the new thiazole compound of this invention has many useful properties. For example, it is possible to prepare cyanine dyes therefrom which are capable of sensitizing photographic emulsions strongly and cleanly, i.e. without the production of excessive fog or residual dye stain.

It is known that cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain. With the thiazole compound of this invention, it is possible to prepare cyanine dyes in which one or both of the aforesaid auxochromic nitrogen atoms lie in a 6,7-dihydro-5-H-thiopyrano(3,2d)-thiazole nucleus.

Accordingly, it is the primary object of the present invention to provide the new thiazole compound 2-alkyl-6,7-dihydro-5-H-thiopyrano(3,2d)thiazole.

In accordance with the invention, there is provided the new compound 2-alkyl-6,7-dihydro-5-H-thiopyrano-(3,2d)thiazole having the general formula

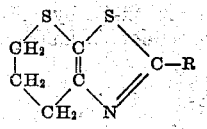

wherein R represents an alkyl radical $C_NH_{2N+1}$ and N is a positive integer of from one to three.

Also, in accordance with the invention, there is provided a process for preparing 2-alkyl-6,7-dihydro-5-H-thiopyrano(3,2d)thiazole comprising reacting 2-bromo-2,4,5,6-tetrahydro-1-thio-3-pyranone with a thioamide, e.g., thioacetamide or thiopropionamide under heat in an absolute alcohol solution or in the absence of solvent.

For a better understanding of the invention, together with other and further objects thereof, reference is had to the following description and its scope will be pointed out in the appended claims.

The following examples will serve to demonstrate the manner of preparation of my new thiazole and quaternary salts thereof. These examples are not intended, however, to limit my invention.

*Example 1.—2-methyl-6,7-dihydro-5-H-thiopyrano-(3,2d)thiazole*

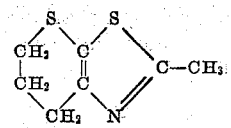

25.0 g. (1 mol) of 2,4,5,6-tetrahydro-1-thio-3-pyranone (prepared by the method of Fehnel, J. Am. Chem. Soc. 74, 1569 (1952)) was added to a mixture of 38.2 g. (1 mol) of N-bromosuccinimide and 50 ml. of dry carbon tetrachloride. The solution was stirred mechanically and after a short time, a vigorous exothermic reaction occurred causing refluxing. After the reaction subsided, the mixture was refluxed on the steam bath for 5 minutes. The solution was chilled in an ice bath, the precipitated succinimide was removed by suction filtration and the filtrate was evaporated under reduced pressure. The 2-bromo-2,4,5,6-tetrahydro-1-thio-3-pyranone thus obtained was used directly in the preparation of the thiazole base. It was mixed with 15.0 g. (1 mol) of thioacetamide and 100 ml. of absolute ethanol and allowed to stand at 0° C. for 3 hours, then overnight at room temperature and finally refluxed for 2 hours. The alcohol was distilled off and the viscous brown residue was diluted with 200 ml. of cold water. The solution was extracted with 200 ml. of ether to remove tarry impurities and the ether extract was washed with 200 ml. of 5% HCl. The acid washings were combined with the first water solution and made alkaline with dilute $NH_4OH$. The oily precipitate was taken up in ether, dried with $K_2CO_3$ and evaporated. The product was distilled under reduced pressure. The material boiled at 154–156° at 22 mm. The yield was 18.0 g., 49% of theory. The base was redistilled in high vacuum, boiling at 90 to 92° at 0.5 mm., after which it crystallized to long pale brown needles on cooling. Although the most probable formula for the product is that shown above, it is theoretically possible for the bromination to take place in the 4 position of the tetrahydrothiopyranone ring which would lead to the isomeric thiazole shown below:

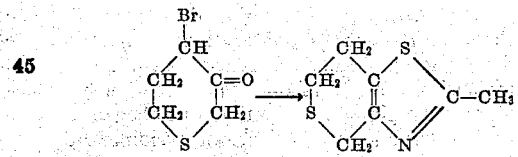

However, only one product is obtained from this reaction and regardless of its theoretical structure, it is the new compound claimed in this invention and gives rise to the new dyes described herein.

*Example 2.—2-methyl-6,7-dihydro-5-H-thiopyrano-(3,2d)thiazole ethiodide*

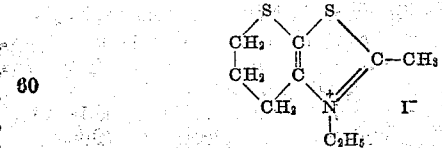

10.0 g. (1 mol) of 2-methyl-6,7-dihydro-5-H-thiopyrano(3,2d)thiazole and 20 g. (1 mol plus excess) of ethyl iodide were refluxed for 16 hours. The crystalline product was crushed under ether, filtered, washed on the filter with acetone and dried. The yield of tan crystals was 13.0 g., 68%. The product had M.P. 150–152° with decomposition after recrystallization from absolute ethanol. Anal. calcd. for $C_9H_{14}INS_2$: I, 38.80, N, 4.28, S, 19.60; found I, 38.51, N, 4.11, S, 19.52.

As starting material for the preparation of novel cyanine dyes, the 2-alkyl-6,7-dihydro-5-H-thiopyrano(3,2d)-thiazole is first converted to a quaternary salt by reacting it with an ester such as ethyl iodide set forth hereinabove in Example II. Other examples of esters are other alkyl halides, alkyl sulfates, alkyl-p-toluene sulfonates, etc. For purposes of convenience, the quaternary salts useful in preparing the new cyanine dyes can be represented by the single formula

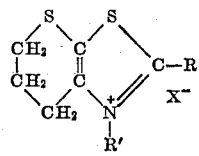

wherein R' represents an alkyl group such as methyl, ethyl, n-propyl, isobutyl, β-hydoxyethyl, β-methoxyethyl, β-ethoxyethyl, β-acetoxyethyl, β-carboxyethyl, carboxymethyl, β-carbomethoxyethyl, β-carbethoxyethyl alkyl, etc., or an aralkyl group such as benzyl, phenyl, etc., R represents methyl, ethyl or n-propyl and X⁻ represents an anion, e.g., chloride, bromide, iodide, benzene sulfonate, p-toluene sulfonate, methyl sulfate, ethyl sulfate, thiocyanate, perchlorate, acetate, etc.

To prepare pseudocyanine dyes from such quaternary salts, they are reacted with 2-halogenoquinoline quaternary salts in the presence of an acid binding agent such as sodium ethylate, sodium carbonate, pyridine or a strong organic base such as triethylamine, trimethylamine and N-methylpiperidine. In this connection, it has been found advantageous to employ a mixture of pyridine with a strong tertiary organic base.

Instead of 2-halogenoquinoline quaternary salts, there can be employed 2-alkylmercapto or 2-arylmercaptoquinoline quaternary salts to condense with the quaternary salts of the 2-alkyl-6,7-dihydro-5-H-thiopyrano-(3,2d)thiazole in the presence of an acid binding agent.

Using 2-halogenopyridine quaternary salts instead of 2-halogenoquinoline quaternary salts, there can be prepared pyrido-cyanine dyes containing a 6,7-dihydro-5-H-thiopyrano(3,2d)thiazole nucleus.

Using 2-alkyl mercapto or 2-aryl mercapto benzothiazole or naphthothiazole salts, there can be prepared simple cyanine dyes other than pseudocyanine dyes.

To prepare symmetrical carbocyanine dyes from 2-alkyl - 6,7-dihydro-5-H-thiopyrano(3,2d)thiazole quaternary salts, the quaternary salts are reacted with esters of ortho acids such as ethyl orthoformate, ethyl orthoacetate, ethyl orthopropionate and ethyl orthobenzoate in the presence of pyridine or a mixture of pyridine and triethyl amine.

To prepare unsymmetrical carbocyanine dyes from 2-alkyl - 6,7-dihydro-5-H-thiopyrano(3,2d)thiazole quaternary salts, they are reacted with cycloammonium quaternary salts containing a β-aryl aminovinyl group in the alpha or gamma position, i.e., in one of the so-called reactive positions in the presence of an acid binding agent, e.g., pyridine or pyridine and triethylamine.

To prepare styryl dyes from the new quaternary salts of this invention, they are condensed with p-dialkyl aminobenzaldehyde in the presence of an alkaline catalyst such as piperidine in absolute ethanol solution.

To prepare merocarbocyanine dyes from 2-alkyl-6,7-dihydro-5-H-thiopyrano(3,2d)thiazole quaternary salts, they are condensed with ketomethylene heterocyclic intermediates containing an aryl aminomethylene group in the 5-position in the presence of an acid binding agent, e.g., pyridine plus triethylamine. Examples of such ketomethylene intermediates are 5-acetanilidomethylene-3-ethyl rhodanine, 5-acetanidomethylene-3-ethyl-1-phenyl-2-thiohydantoin, etc.

To sensitize photographic silver halide emulsions with the aforesaid dyes, they are dispersed in the emulsions such as the conventional gelatino-silver halide, e.g., gelatino-silver bromide, bromoiodide, chloride and chlorobromide. The methods of incorporating these dyes in the emulsions are simple and well known to those skilled in the art, and described in various patents and publications. A typical method, for example, is the one described in U.S. Patent 2,336,843, patented December 14, 1943.

While there have been described what are at present considered to be the preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. The new compound, 2-alkyl-6,7-dihydro-5-H-thiopyrano(3,2d)thiazole having the general formula:

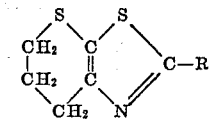

where R represents an alkyl radical $C_nH_{2n+1}$ and $n$ is a positive integer selected from the group, one to three, both inclusive.

2. The new compound 2-methyl-6,7-dihydro-5-H-thiopyrano(3,2d)thiazole having the structure:

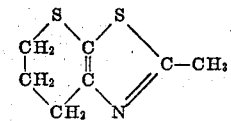

3. The new compound consisting of a quaternary salt of the compound described in claim 1 having the following general formula:

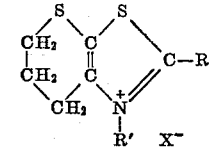

where R represents an alkyl radical $C_nH_{2n+1}$, $n$ is a positive integer selected from the group, one to three, both inclusive, and R' represents a member selected from the group consisting of alkyl and aralkyl groups, and X⁻ represents an anion.

4. The new compound 2-methyl-6,7-dihydro-5-H-thiopyrano(3,2d)thiazole ethiodide having the structure:

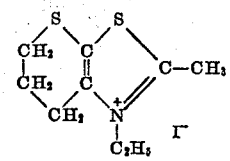

5. The new compound 2-methyl-6,7-dihydro-5-H-thiopyrano(3,2d)thiazole etho-p-toluene sulfonate having the structure:

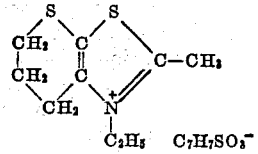

6. A process for preparing new 2-alkyl-6,7-dihydro-5-H-thiopyrano(3,2d)thiazole bases consisting of reacting 2,4,5,6-tetrahydro-1-thio-3-pyranone with N-bromo succinimide in carbon tetrachloride solution and after removal of the CCl₄ reacting the product with a thioamide selected from the group consisting of thioacetamide, thiopropionamide and thiobutamide.

7. A process for preparing 2-methyl-6,7-dihydro-5-H-thiopyrano(3,2d)thiazole consisting of reacting 2,4,5,6-tetrahydro-1-thio-3-pyranone with N-bromo succinimide in carbon tetrachloride solution and, after removal of the carbon tetrachloride, reacting the product with thioacetamide in absolute ethanol solution.

8. A process for preparing quaternary salts of the folling general formula:

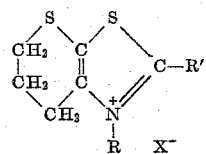

in which R represents a member selected from the group consisting of alkyl and aralkyl groups, R' represents an alkyl group and X$^-$ represents an anion comprising reacting 2 - alkyl-6,7-dihydro-5-H-thiopyrano(3,2d)thiazole with a reagent selected from the group consisting of alkyl halides, aralkyl halides and esters of sulfuric acid and p-toluene sulfonic acid.

9. A process for preparing 2-methyl-6,7-dihydro-5-H-thiopyrano(3,2d)thiazole ethiodide consisting of heating 2 - methyl-6,7-dihydro-5-H-thiopyrano(3,2d)thiazole with ethyl iodide.

10. A process for preparing 2-methyl-6,7-dihydro-5-H-thiopyrano(3,2d)thiazole etho-p-toluene sulfonate consisting of heating 2-methyl-6,7-dihydro-5-H-thiopyrano-(3,2d)thiazole with ethyl-p-toluene sulfonate.

References Cited in the file of this patent

Elderfield: Heterocyclic Compounds, vol. 5, pp. 496–8, 519 (1957).